US005638987A

United States Patent [19]

Melenric

[11] Patent Number: 5,638,987

[45] Date of Patent: Jun. 17, 1997

[54] GENERAL PURPOSE VALVE FOR SMALL PROPANE BOTTLES

[76] Inventor: John A. Melenric, 8417 Cedarbrake, Houston, Tex. 77055-4825

[21] Appl. No.: 199,643

[22] Filed: Feb. 22, 1994

[51] Int. Cl.[6] .......... B67D 5/00

[52] U.S. Cl. .......... 222/3; 222/146.2; 251/149.4; 251/149.5

[58] Field of Search .......... 222/3, 146.2, 402.1, 222/402.11; 251/149.4, 149.5

[56] References Cited

U.S. PATENT DOCUMENTS

| | | | |
|---|---|---|---|
| 3,190,496 | 6/1965 | Weiland, Jr. et al. | 222/3 |
| 3,924,654 | 12/1975 | Buller et al. | 251/149.4 X |
| 4,188,172 | 2/1980 | Talbert et al. | 222/146.2 X |
| 4,562,852 | 1/1986 | Britt | 222/3 X |
| 4,807,848 | 2/1989 | Macomber | 251/149.1 |
| 5,121,771 | 6/1992 | Jernberg | 251/149.5 X |

*Primary Examiner*—Joseph Kaufman

[57] ABSTRACT

A throttling and cut-off valve providing fuel control for heaters, blow torches, lanterns and small engines utilizing the approximately one pound throwaway propane bottles in common use as a fuel supply. The invention provides one valve integral to the quick disconnect housing of the throwaway bottle that will suffice for all implements utilizing these bottles. The invention incorporates a cap with female threads compatible with the male threads of the quick disconnect housing which is an integral part of the fuel bottle. The cap is rotatably secured to a fuel probe that penetrates the center of the housing and a seated O-ring opening the spring loaded tire valve secured to the upstream end of the housing. Rotating the cap and inserting it into this quick disconnect housing secures the cap and probe to the bottle; rotating the cap further moves the probe forward causing fuel to flow through the probe and fuel line into the implement. The cap thus becomes a throttling valve for the attached implement. The cap can also function as a quick cutoff valve for a more elaborate fuel control system.

3 Claims, 1 Drawing Sheet

GENERAL PURPOSE VALVE FOR SMALL PROPANE BOTTLES

CROSS REFERENCE TO RELATED APPLICATION

This device is generally related to many fuel valves in use today, it has a unique embodiment suitable for a specific use with the standard throw-away propane bottle utilized all over the world. The valve functions with other similarly designed bottles.

BACKGROUND OF THE INVENTION

Common throw-away propane bottles carrying approximately one pound of fuel are in use throughout the world providing fuel for blow torches, lanterns, small engines, and other devices. Each device requires a special valve to regulate fuel quantity. It is the object of this invention to provide an extremely simple valve that is common to all devices using the propane bottle as a fuel source.

SUMMARY OF THE INVENTION

This invention relates to small valves that regulate fuel flow from the one pound throw-away propane bottle in common use all over the world. The bottles provide fuel for blow torches, lanterns, small engines, heaters, and other devices. Each device requires its own unique valve. It is the object of this invention to provide one valve integral to the quick disconnect housing of the throw-away bottle that will suffice for all devices utilizing these bottles. The device of this invention incorporates a cap with female threads compatible with the male threads of the quick disconnect housing which is an integral part of the fuel bottle. The cap is rotatably secured to a fuel probe which penetrates the center of the housing, a seated O-ring opening and a spring loaded tire valve secured to the upstream end of the housing. Rotating the cap and inserting it into the housing first secures the cap and probe to the bottle; rotating the cap further moves the probe forward causing fuel to flow through the probe and fuel line into the implement. The cap thus becomes a throttling valve for the attached implement. The cap can also function as a quick shut-off valve for more elaborate fuel control systems.

DESCRIPTION OF THE PREFERRED EMBODIMENT

Figure 6:
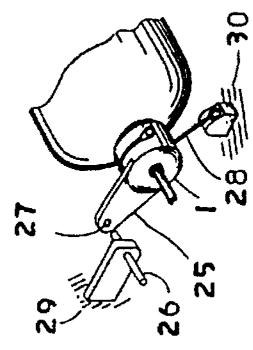
FIG. 6 is an isometric drawing of the cap functioning as a throttling valve in conjunction with a spring loaded cutoff device.
Figure 5:
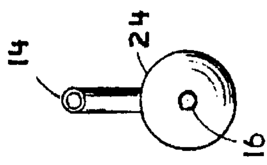
FIG. 5 is a vertical cross sectional view of the second valve taken substantially on line 5—5 of FIG. 4.
Figure 2:
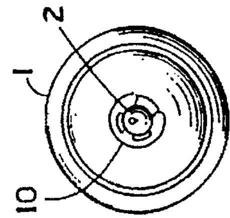
FIG. 2 is a front elevational view of the same.

For a description of the preferred embodiment, its method of construction and operation, reference is made to the attached views and following detailed description wherein identical reference characters refer to identical or equivalent components throughout the several views and the following detailed description.

Figure 4:
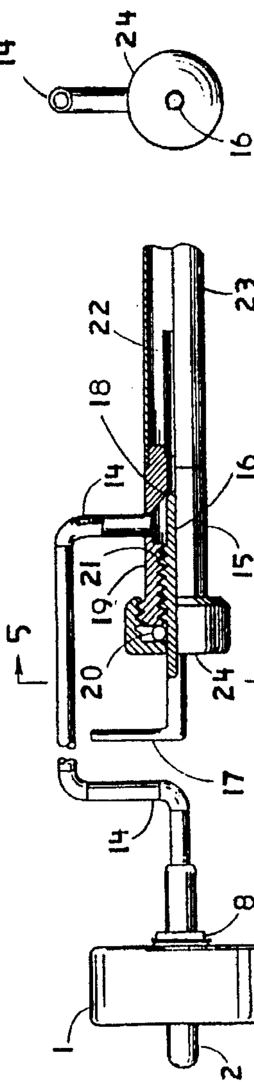
FIG. 4 is a side elevation of the cap and probe secured to a second valve partially in cross section.
Figure 1:
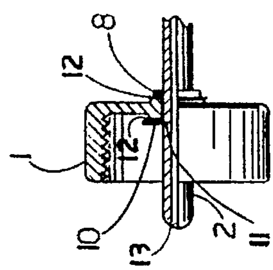
FIG. 1 is a side elevation partially in cross section of the valve cap and probe.

The device of this invention may be constructed from various metals and plastics as desired. Referring to FIG. 1, the device consists of a metal or plastic cap 1 which rotatably secures to a probe 2 and, a fixed washer 8 secured to the probe 2, preventing aft movement of cap 1 relative to probe 2, a snap ring 10 preventing forward movement of cap 1 relative to probe 2. The fuel line 2 is restricted at the tip end with a very small orifice 13 that controls the maximum flow of fuel for the various implements utilizing the cap 1. The probe inserts into a standard propane throw-away bottle shown in FIG. 3. The bottle 3 contains a quick disconnect 4. The housing 5 of the disconnect contains standard threads 6 enabling various standard implements such as torches, lanterns and stoves to screw on the propane bottle 3. It is necessary to rotate or screw these devices on to the bottle 3 or rotate the bottle 3 on to the devices. This invention contains a metal or plastic cap 1 which rotatably secures to metal or plastic probe 2 designed and contoured to insert into the standard propane bottle 3 at its quick disconnect 4 without rotating the tank or implement. As the cap 1 is rotated it moves the probe 2 forward into the bottle 3 gradually opening the standard tire valve 7 which is part of the standard quick disconnect. The thread pitch size is such that precise throttling can be obtained. Usually one half turn of cap 1 provides satisfactory fuel flow throttling for the devices secured to the bottle 3. The forward and aft movement of cap 1 relative to the probe 2 is restricted by fixed washers 8 permanently secured to the fuel probe 2. When forward and aft adjustment is desired moveable washers 12 are inserted between fixed washer 8 and the cap housing 1. Washers may also be placed between cap housing 1 and snap ring 10 which inserts into a cutout groove 11 located in probe 2. The snap ring 10 replacing the forward fixed washer previously described. There are numerous other methods for rotatably securing the cap to the probe and the patent is not limited to the one Just described but to all obvious other methods. While the cap 1 may function as a primary throttling valve for implements, it can also function as a master cutoff for a more sophisticated fuel system as shown in FIG. 4. This system is used essentially for liquid propane systems in which valve freeze-up can be a problem. Fuel flows from probe 2 through fuel line 14 into the secondary valve 15. The valve contains a housing 19. The fuel needle valve 15 shown in FIG. 4 secures to a heat exchanger 23 located in the implement being fueled. Fuel valve 15 contains a stem 16 and lever 17 threaded toward the forward end and a needle tip 18 housed in the bonnet 19. An O-ring 20 prevents fuel leakage between the threads 21 of the bonnet 19 and valve stem 16. Fuel line 14 secures to bonnet 19 slightly upstream of needle tip 18. Aft and down-stream of needle tip 18 is a much smaller diameter tube 22 that is sized to provide only the maximum flow of liquid propane at relatively high velocity for the particular implement being fueled. The small tube 22 extends as far as is structurally possible into the heat exchanger tube 23. O-ring cap 24 contains O-ring 20 in its proper position. FIG. 6 shows how it is possible to incorporate a lever 25 with cap 1 making it easier to turn. A fuel cutoff is provided by mounting 29 and pin 26 in juxtaposition with a hole 27 located near the end of lever 25. A spring or elastic cord 28 is secured to cap 1 and a fixed position 30. Fixed positions 29 and 30 are parts of the frame holding the bottle 3 and the valve system FIG. 4 which varies depending on the implement being fueled.

OPERATION OF THE DEVICE

Figure 3:
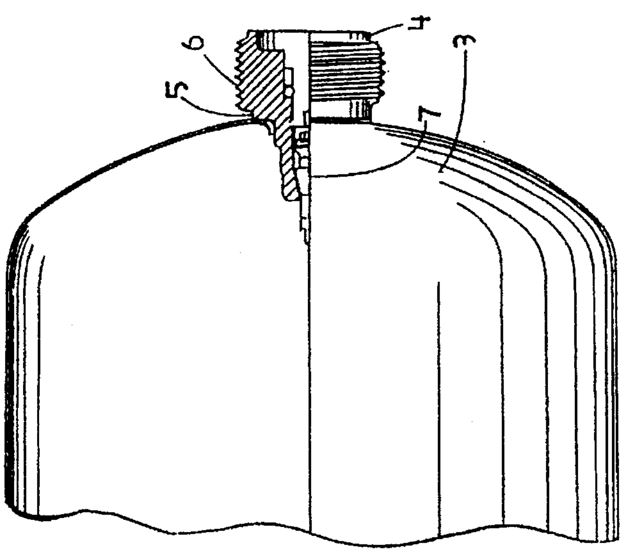
FIG. 3 is a side elevation view partially in cross section of a typical propane throw-away bottle shown as a reference drawing to aid in the description of the invention.

In the operation of the valve, cap 1 which is rotatably secured to probe 2 and fuel line 14, is inserted and rotated into a standard throw away propane bottle 3 shown in FIG. 3. The cap 1 and probe 2 are inserted into the hole provided in the quick disconnect housing 5. The first couple of rotations made on cap 1 stabilizes and secures the tank and cap together without fuel transfer. As the cap is rotated further fuel will start flowing from the bottle 3 into the fuel line 14. The cap now functions as a valve metering fuel precisely as a needle valve. If the fuel bottle 3 is placed upright only propane gas will flow through the system as required by many implements.

Some devices, including engines, which require higher fuel flow must be fed to the system in the liquid state. FIG. 4 shows a system for transferring liquid propane to the devices. The propane bottle must be turned upside down or tilted on its side to transfer the liquid. Some bottles have the quick disconnect located on the lower edge of the bottle to facilitate liquid transfer. The cap 1 now functions as the primary on and off valve. Fuel line 14 secures to a secondary throttling valve 15. The diameter of the fuel line upstream of the needle valve stem 16 is kept relatively large so the propane fuel will flow at low velocity and in the liquid state. This prevents cap 1 and fuel line 14 from freezing causing intermittent flow in the line. The secondary valve 15 is located as close as possible to heat exchanger 23. Each implement using the liquid propane system must have a heat exchanger capable of vaporizing the liquid propane before it is utilized. The very small diameter line 22 which is located downstream of the needle valve tip 18 should have a fuel capacity just equaling the fuel required for operation. This helps prevent freezing in the heat exchanger during the start procedure. Rotating throttle lever 17 controls fuel flow in the secondary valve 15. The spring loaded cap 1 shown in FIG. 6 and previously described is particularly useful when operating a remote control device. Pulling pin 26 releases cap 1 cutting off fuel in a fraction of a second. The simplified spring loaded cap as shown descriptively in FIG. 6 is used only to describe the function of cap 1. Actually ratchets and springs or other means may be preferred to accomplish the action.

By emphasizing the structural features of this improved device, I do not intend to specifically limit my claims to the exact structure described. What is desired to be claimed is all devices incorporating equivalent structures not departing from the scope of the appended claims or their equivalents.

I claim:

1. A throttling valve comprising:

a substantially cylindrical tube capable of being inserted into or probing a standard throw-away propane bottle containing a fuel bottle quick disconnect body and a fuel bottle quick disconnect valve, said disconnect valve being a standard tire valve, said probing end being smooth, rounded and essentially closed off with the exception of a small hole located in such a position that the stem of said standard tire valve will not interfere with fuel flowing through it, b. a round cap with a female thread compatible with a male thread of said bottle quick disconnect body, said round cap being capable of screwing onto said male thread of the bottle, quick disconnect body, said round cap being rotatably secured to said cylindrical tube probing end through a hole in the center of the round cap containing a low friction bearing surface between said cylindrical tube and said round cap, the cap being capable of moving the cylindrical tube probing end fore and aft along its longitudinal axis thus opening and closing said standard tire valve, movement providing precise control of fuel flow from said standard throw away propane bottle, the down stream end of said cylindrical tube becoming a fuel line and connecting to a fuel using implement and, wherein said round cap is rotatably secured to said probing end with a fixed washer permanently secured to the cylindrical tube and restricting aft movement of said round cap, a suitable groove cut to accept a snap ring preventing forward movement of said round cap, spacer washers inserted between the snap ring and round cap or the fixed washer and the round cap permits longitudinal adjustment between said cylindrical tube probing end and said standard tire valve.

2. The invention of claim 1 wherein a needle valve securing to said fuel line and located downstream of said throttling valve, said needle valve containing a female threaded main body or bonnet, a male threaded shaft with a needle tip and a lever at the opposite end, the threaded shaft being compatible with said threaded main body, the threaded shaft needle tip fitting into a tapered seat located in the downstream end of said threaded main body, said fuel line securing to said main body at an angle substantially normal to said main body slightly upstream of the threaded shaft needle tip, an O-ring and a round protection cap located on the lever end of the threaded shaft preventing fuel leakage between the threads of the threaded shaft and the threads of said main body, a small tube secured to and extending down stream from said tapered seat into a tubular heat exchanger of larger diameter, the tubular heat exchanger up stream end secures to the down stream outer edge of said needle valve main body, the tubular heat exchanger being an integral part of the using implement preventing frost buildup in said needle valve.

3. The invention of claim 1 wherein said round cap contains a lever arm, said lever arm outer edge containing a hole or a suitable bearing surface, said round cap and said standard throw away propane bottle being mounted in a fixed container, said round cap containing a spring loaded device which tends to rotate said cap to an off position, a pin secured to the container but free to translate normal to and through said hole or bearing surface of said lever arm outer edge, said pin is engaged to the lever arm to maintain fuel flow through the turned-on valve, said pin is disengaged from the lever arm to stop fuel flow through the valve.

* * * * *